United States Patent [19]

Kuno et al.

[11] Patent Number: 4,926,275
[45] Date of Patent: May 15, 1990

[54] MAGNETIC HEAD CARRIAGE MECHANISM FOR A MAGNETIC DISK

[75] Inventors: Hiroyuki Kuno; Yujirou Iino, both of Tokyo, Japan

[73] Assignee: Kabushiki Kaisha Toshiba, Kawasaki, Japan

[21] Appl. No.: 172,404

[22] Filed: Mar. 24, 1988

[30] Foreign Application Priority Data

Mar. 30, 1987 [JP] Japan .................................. 62-76720

[51] Int. Cl.⁵ .............................................. G11B 5/55
[52] U.S. Cl. ...................................... 360/106; 360/104
[58] Field of Search ............................ 360/104–106, 360/109, 102–103, 97.01, 98.07, 99.04, 99.08

[56] References Cited

U.S. PATENT DOCUMENTS

| 4,620,251 | 10/1986 | Gitzendanner | 360/103 |
| 4,743,995 | 5/1988 | Castle et al. | 360/98.07 |
| 4,783,710 | 11/1988 | Salyer et al. | 360/104 |
| 4,787,001 | 11/1988 | Okutsa | 360/106 |

OTHER PUBLICATIONS

Japanese Patent Disclosure (Kokai), No. 61-51678, Mar. 14, 1986.

Primary Examiner—John H. Wolff
Attorney, Agent, or Firm—Finnegan, Henderson, Farabow, Garrett and Dunner

[57] ABSTRACT

A carriage mechanism for a magnetic disc includes a head arm rotatable around a rotational center. A slider is supported by the head arm and arranged such that its principal axis forms a specified angle with a straight line passing through the rotational center of the head arm and a center of the slider, so as to reduce the yaw angle of the slider. A magnetic head having a magnetic gap is provided in the slider. The principal axis of the gap passes through the center of, and extends in the lengthwise direction of the gap. The magnetic head is so arranged that an extension of the principal axis of the magnetic gap passes through the rotational center of the head arm and forms a specified angle with the principal axis of the slider, in order to reduce the azimuth angle of the gap.

6 Claims, 8 Drawing Sheets

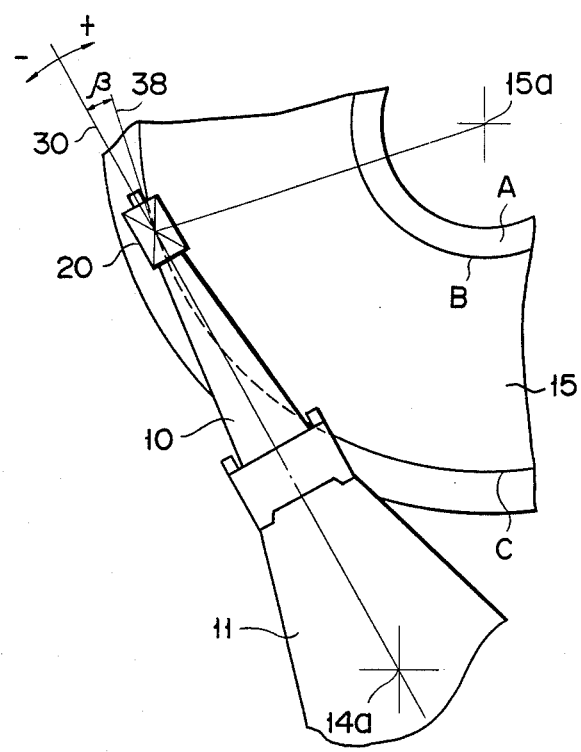
F I G. 6
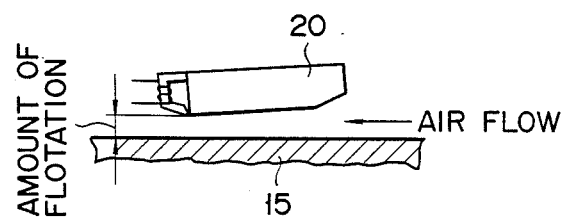
F I G. 7

MAGNETIC HEAD CARRIAGE MECHANISM FOR A MAGNETIC DISK

BACKGROUND OF THE INVENTION

This invention relates to a carriage mechanism for a magnetic disc apparatus and, more particularly, to a carriage mechanism incorporating a rotary type actuator.

Hard disc apparatuses normally use a carriage mechanism having a rotary type actuator. This type of carriage mechanism comprises an arm, the central part of which is rotatably supported, a suspension fixed to one end of the arm and holding a magnetic head, and a voice coil motor mounted on the other end of the arm, for rotating the arm. The magnetic head has a slider which moves above a disc (a magnetic recording medium) and is provided with a read/write gap. When the arm of the carriage mechanism is rotated, the slider moves, in a floating manner, over the surface of the rotating disc to a desired track, and is positioned thereabove.

In recent years, there has been growing demand for hard disc apparatuses of increased access speed, as well as for reduction of the size and weight of the main components making up these apparatuses. With the aim of meeting these requirements, a rotary carriage mechanism of a straight type has been developed in which the slider, the suspension, and the arm are coupled to one another so that their principal axes are in alignment with one another and pass through the rotational center of the arm. By virtue of this configuration, the distance from the rotational center of the arm to the magnetic head can be reduced, thus decreasing the moment of inertia of the section which extends from the rotating center to the magnetic head. As a result, access time can be reduced, as can the size and weight of the apparatus. However, when this type of carriage mechanism uses either a composite type or a thin-film type magnetic head, the following problems arise:

The read/write gap of the above-mentioned types of magnetic head is situated in an offset position, with the center of the gap being shifted a specified amount with respect to the principal axis of the slider. Thus, the principal axis of the gap (a line which passes through the center of, and extends in the lengthwise direction of the gap) does not pass through the rotational center of the arm. Consequently, when a carriage mechanism constructed thus is employed in a disc apparatus using the servo surface servo method, the timing of readout of servo data by the servo head will differ from track to track. Thus, the positioning accuracy of the magnetic head is reduced.

Compared with a monolithic magnetic head, in which the principal axis of the slider is aligned with the axis of the gap, the composite type and the thin film type magnetic heads are superior in such characteristics as crosstalk and sound-to-noise ratio and, as a result, their use has been growing in recent years. This being so, a carriage mechanism is then called for which is compatible with a composite type or a thin film type magnetic head and is capable of positioning such a head with high accuracy.

The smaller the size of a rotary type carriage mechanism, the larger the yaw angle of the magnetic head becomes. Any increase in the yaw angle of the magnetic head results in it having reduced floating stability during operation. Consequently, if a carriage mechanism such as is disclosed in, for example, Japanese Patent Publication No. 86-51678, is employed, without modification, in a compact hard disc apparatus using 3.5-inch discs, its magnetic head will have reduced floating stability, greatly increasing the possibility of the magnetic head or disc being damaged during operation.

SUMMARY OF THE INVENTION

The present invention has been developed in consideration of the above situation and has as its object to provide a rotary type carriage mechanism which permits increased speed of access, as well as a reduction in both the size and weight of the apparatus, and which can position the magnetic head with high accuracy and maintain it in a stable floating attitude.

In order to achieve the above object, according to one aspect of this invention, a suspension and a slider incorporating a magnetic head are connected linearly so that their principal axes are located on the same line. The read/write gap of the magnetic head has a principal axis which passes through the center of the gap and extends in the lengthwise direction of the gap, and is arranged so that the rotational center of the arm lies on the extension of the principal axis, and the principal axis is parallel with the principal axis of the slider.

According to another aspect of this invention, the head arm and the slider incorporating the magnetic head are connected in a generally straight line and the slider is arranged such that its principal axis forms a specified first angle with a straight line passing through the rotational center of the arm and the center of the gap. The read/write gap is located such that an extension of its principal axis passes through the rotational center of the arm.

BRIEF DESCRIPTION OF THE DRAWINGS

FIGS. 1 and 2 show a carriage mechanism according to a first embodiment of this invention, in which FIG. 1 is a schematic view of the whole carriage mechanism, and FIG. 2 is an enlarged view of a slider and a suspension of the carriage mechanism;

FIG. 6 is a schematic view of the carriage to explain the yaw angle of the slider, FIG. 7 is a schematic view illustrating the floating condition of the slider.

DETAILED DESCRIPTION OF THE PREFERRED EMBODIMENTS

With reference to the accompanying drawings, preferred embodiments of this invention will now be described in detail.

Figure 1:
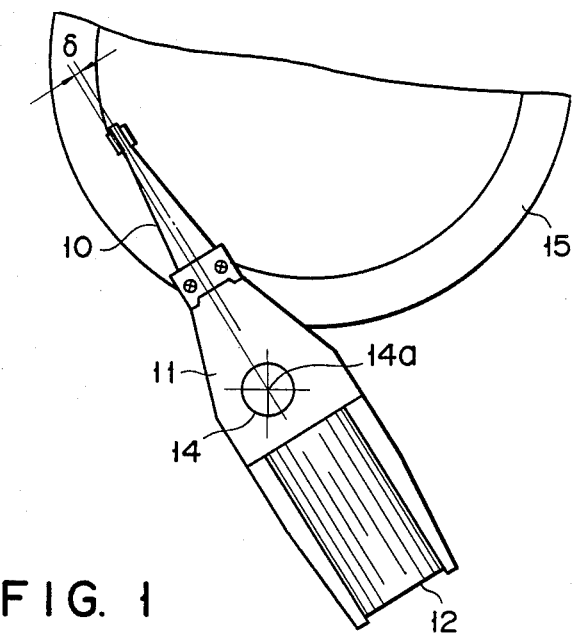

FIG. 1 schematically illustrates a rotary carriage mechanism according to a first embodiment of this invention.

As is shown in FIG. 1, the carriage mechanism has head arm 11 whose middle section is rotatably supported by pivot 14, and head arm 11 is coupled at one end to gimbal spring 10 serving as a suspension. Voice coil motor 12 for rotating head arm 11 is mounted on the other end of the arm. Slider 20 is supported by gimbal spring 10 and magnetic head 22 is fixed to the slider. Arm 11, gimbal spring 10 and slider 20 are connected to one another generally in a straight line.

Figure 2:
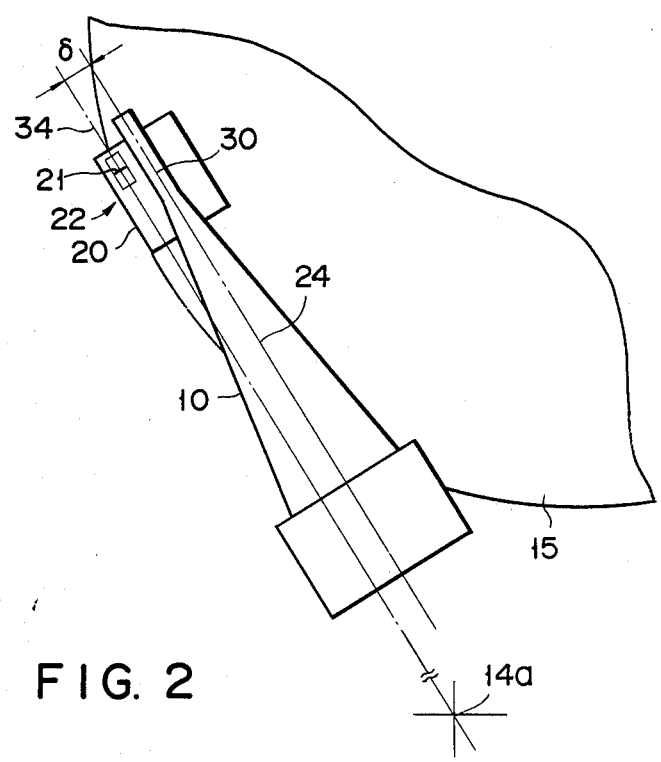

As is clear from FIG. 2, slider 20 is generally in a rectangular form and is arranged so that its principal axis 30 aligns with the principal axis 24 of spring 10. A composite type magnetic head is used for magnetic head 22. Read/write gap 21 of magnetic head 22 has principal axis 34 passing through the center of the gap and extending in the lengthwise direction of the gap. Magnetic head 22 is arranged so that principal axis 34 of gap 21 is offset a specified amount, about 1.2 mm for example, with respect to principal axis 30 of slider 20 and is parallel with principal axis 30. Pivot 14 of arm 11 is located in a manner that pivot center 14a is located on the extension of principal axis 34 of gap 21. A thin film type magnetic head may be used for magnetic head 22.

With the carriage mechanism constructed as described above, when head arm 11 is rotated about pivot 14 by driving voice coil motor 12, slider 20 is moved in a radial direction of disc 15 while floating above the surface of the rotating disc. Magnetic head 22 mounted on slider 20 moves to a target track of disc 15 and is positioned thereon.

With the above construction in which slider 20, gimbal spring 10 and head arm 11 are connected generally in a straight line, the distance between the rotational center of the arm and the head is short. This enables the whole carriage mechanism to be reduced in size and weight. At the same time, the inertial weight of the section which extends from the rotational center of arm 11 to magnetic head 22 is decreased, making it possible to increase the speed of access. The rotational center 14a of arm 11 is arranged to be on the extension of principal axis 34 of gap 21. Therefore, when arm 11 rotates about pivot 14, magnetic head 22, that is, the center of gap 21 moves on an arc of a circle coaxial with rotational center 14a, and gap 21 is always positioned on tangents to the arc. Hence, it is possible to prevent a decrease in positioning accuracy of magnetic head resulting from a positional misalignment between gap 21 and rotational center 14a. Gap 21 can be correctly positioned on the servo data recorded along the radial direction of a magnetic disc, particularly when the above-mentioned carriage mechanism is applied to a disc apparatus incorporating the servo surface servo system. As a result, readout of servo data can be correctly timed with the positioning of the magnetic head to a target track of the disc, corresponding to the servo data. Thus, the positioning accuracy of the magnetic head can be improved.

Figure 3:
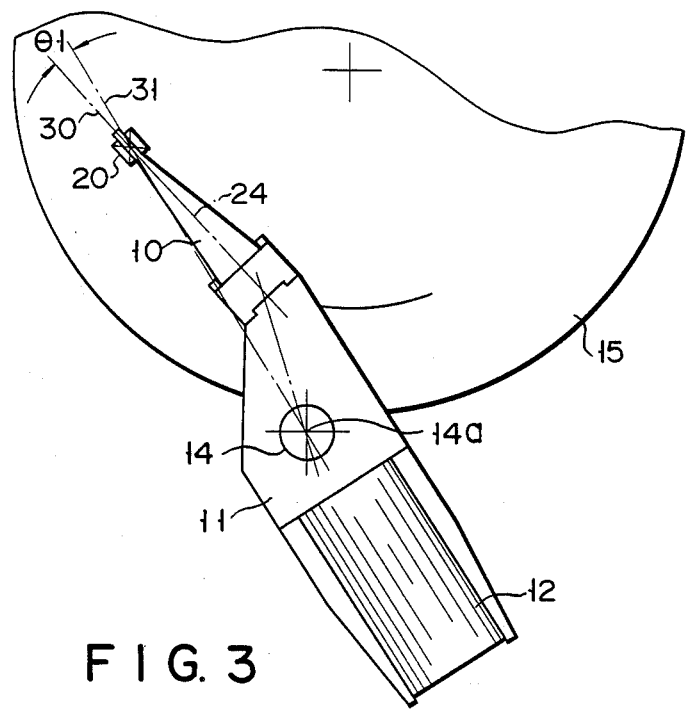
FIG. 3 is a schematic view of the whole carriage mechanism.
Figure 4:
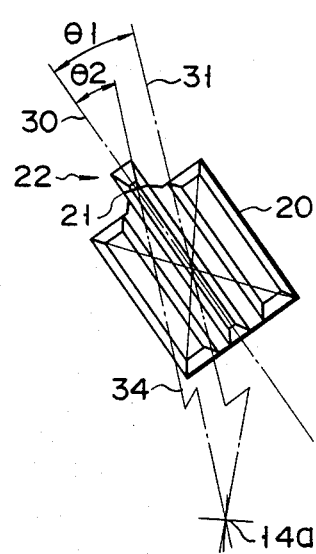
FIG. 4 is an enlarged view of a slider provided with a monolithic magnetic head.

FIGS. 3 and 4 show the carriage mechanism according to a second embodiment of this invention. In this embodiment, like in the above-mentioned embodiment, head arm 11, gimbal spring 10 and slider 20 are connected to one another generally in a straight line. Arm 11 is supported rotatably around pivot 14 and rotated by voice coil motor 12. Slider 20 is arranged so that its principal axis 30 is in alignment with principal axis 24 of spring 10 and angle $\theta_1$ is defined between the slider axis and straight line 31 passing through the center of the slider and rotational center 14a of pivot 14. As is evident from FIG. 4, a monolithic magnetic head in which the center of magnetic gap 21 is located on the principal axis of slider 20 is used for magnetic head 22. Magnetic head 22 is so structured that the prolonged line of principal axis 34 of gap 21 passes through rotational center 14a of pivot 14 and forms angle $\theta_2$ with principal axis 30 of slider 20. Angles $\theta_1$ and $\theta_2$ are almost equal and set in the range of greater than 0° and equal to or less than 20°, respectively.

Figure 5:
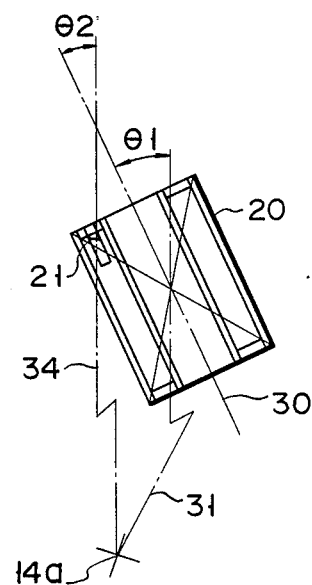
FIG. 5 is an enlarged view of a slider provided with a composite type magnetic head.

FIG. 5 shows a modification of second embodiment in which a composite type magnetic head is used for magnetic head 22. Also in this modification, slider 20 is so arranged that its principal axis 30 forms angle $\theta_1$ with straight line 31 passing through the center of slider 20 and rotational center 14a of arm 11, and magnetic head 22 is so structured that principal axis 34 of gap 21 passes through rotational center 14a of the arm and forms angle $\theta_2$ with principal axis 30 of the slider.

Next, beneficial effects of second embodiment constructed as described above will now be described. It is known that in a carriage mechanism, the yaw angle and the azimuth angle of the magnetic head greatly influence the positioning accuracy of the magnetic head.

Figure 8:
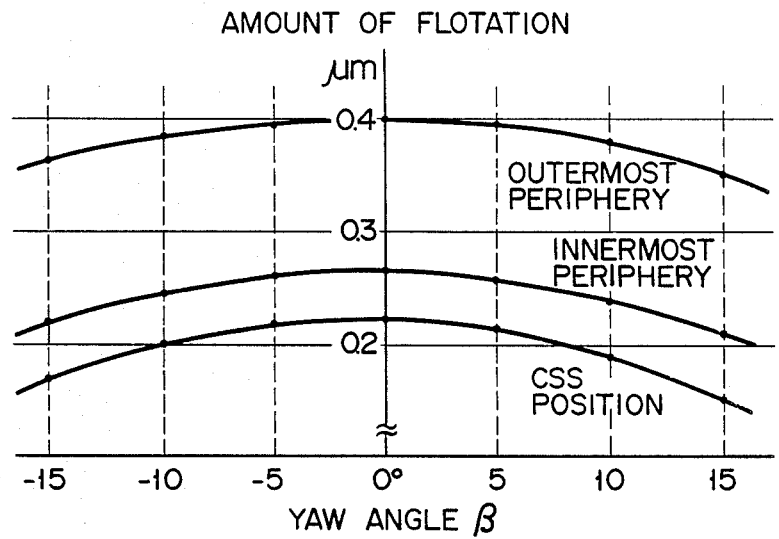
FIG. 8 is a view showing the relation between the yaw angle and the amount of flotation.

Description will first be made of the yaw angle. Referring to FIG. 6, the yaw angle is angle $\beta$ which is formed by principal axis 30 of slider 20 and tangent 38, at the central position of the slider, to a circle coaxial with center 15a of disc 15 and passing through the center of the slider. This yaw angle $\beta$ influences the amount of flotation of slider 20. The amount of flotation is determined by the air flow caused by the rotation disc 15 and coming into the clearance between the disc and slider 20 as is shown in FIG. 7. FIG. 8 indicates that as yaw angle $\beta$ increases, the amount of flotation of slider 20 decreases at the CSS (contact start stop) position A, the innermost peripheral position B and the outermost peripheral position C of disc 15. It is known that the stability of slider 20 (in the rolling and pitching attitude of the slider) is reduced by an increase in the yaw angle.

Figure 9:
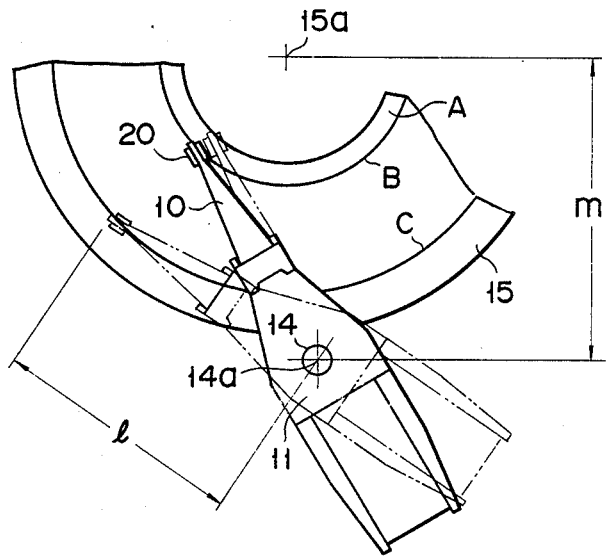
FIG. 9 is a view showing a conventional carriage mechanism.
Figure 10:
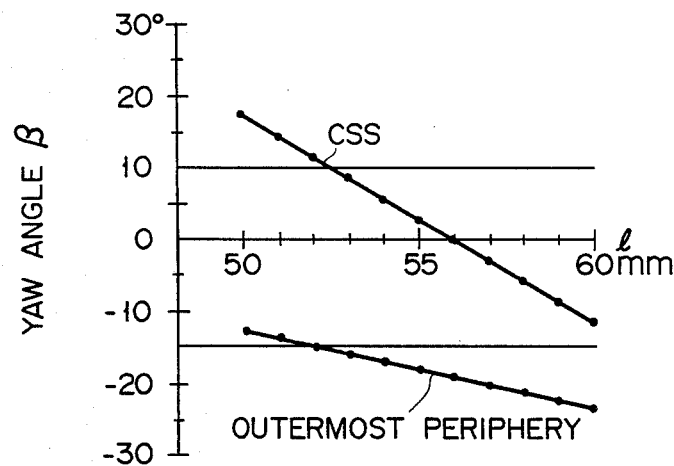
FIG. 10 is a diagram showing changes in the yaw angle when the distance between the center of the gap and the rotational center of the head arm is changed in the conventional carriage mechanism of FIG. 9.

FIG. 9 shows a conventional carriage mechanism in which slider 20 is provided so that its principal axis passes through center 14a of pivot 14 of head arm 11. When, in such a conventional carriage mechanism, the distance m from center 15a of disc 15 to center 14a of pivot 14 is 58.0 mm and the distance l from the magnetic gap to center 14a of the pivot is varied in the range of 50 to 60 mm, the yaw angle $\beta$ at the CSS position A and the outermost peripheral position C change as is shown in FIG. 10. Preferably, the yaw angle $\beta$ is normally 10° or less at the CSS position A and 15° or less at the outermost peripheral position C. When the yaw angle $\beta$ exceeds these ranges, the floating characteristics of the slider deteriorates rapidly, giving rise to accidents such as a head crush. It is apparent from FIG. 10, with the conventional carriage mechanism of FIG. 9, there is no distance l that allows the yaw angle $\beta$ to be set in a desirable range.

A method of increasing the above-mentioned distance m and a method of decreasing the rotating angle (the swing angle of the head arm from the CSS position A to the outermost peripheral position C) are available as the method of solving the problem with the yaw angle described above. However, the former method cannot be applied to small, 3.5-inch or 5-inch magnetic disc apparatuses, for example, due to limitations of their outside dimensions. When the latter method is used, the distance from the CSS position A to the outermost peripheral position C is bound to be small. For this reason, it is necessary to increase the density of tracks when the number of tracks of the magnetic disc is not changed with a magnetic disc apparatus in which the latter method is not used.

Figure 11:
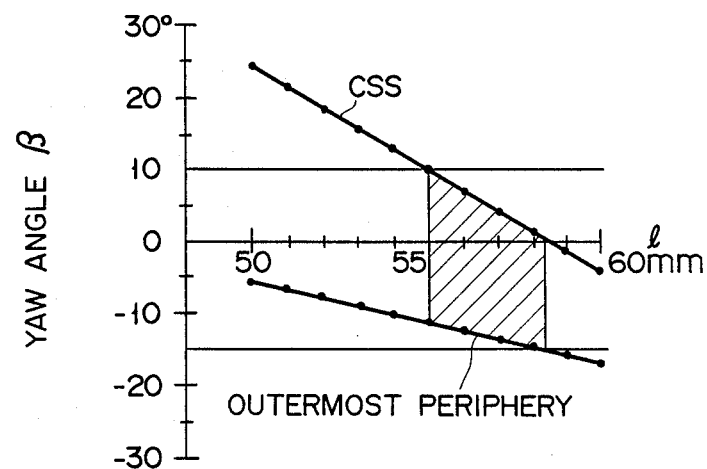
FIG. 11 is a diagram showing changes in the yaw angle when the distance between the center of the gap and the rotational center of the head arm is changed in the carriage mechanism of FIG. 3.

According to the second embodiment described above, in order to decrease the yaw angle, slider 20 is arranged in a manner that the prolonged line of principal axis 30 of slider 20 forms angle $\theta_1$ with straight line 31 that passes through rotational center 14a of head arm 11 and the center of the slider. When angle $\theta_1$ is 7°, if the distance l from center 14a of pivot 14 to the center of gap 21 is varied, the yaw angle $\beta$ changes as is shown in FIG. 11. As can be seen from FIG. 11, there is the yaw angle included in a desirable range (the hatched area). More specifically, when the distance l is in the range of about 55 to 58.2 mm, the yaw angle $\beta$ can be obtained which is 10° or less at the CSS position A and 15° or less at the outermost peripheral position C.

Figure 12:
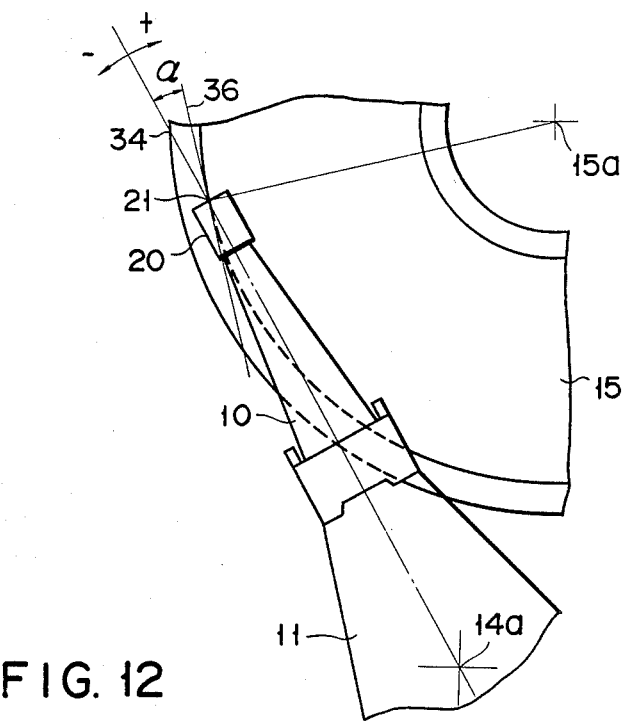
FIG. 12 is a view for explaining the azimuth angle of the magnetic head.

The azimuth angle will now be described in the following. Referring to FIG. 12, azimuth angle $\alpha$ is an angle formed by principal axis 34 of gap 21 and tangent 36, at the center of the gap, to a circle coaxial with center 15a of disc 15 and passing through the center of gap 21.

Figure 13:
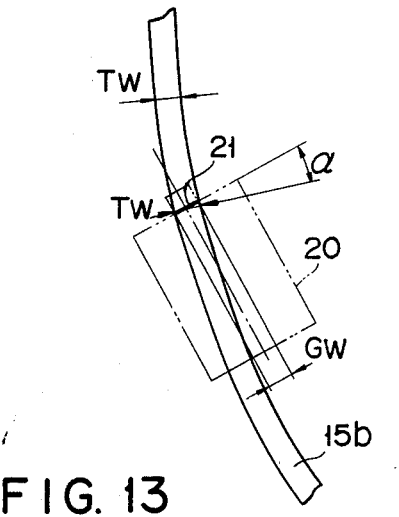
FIG. 13 is a view showing the relation between the azimuth angle and a data track.

Referring to FIG. 13, if the track width of optional data track 15b on the disc is denoted by TW and the width of gap 21 by GW, the following equation can be obtained:

$$TW = GW \times \cos\alpha$$

As is evident from this equation, track width TW decreases with increasing azimuth angle $\alpha$. As a result, the characteristics, particularly, the electromagnetic conversion characteristics of magnetic head 22 is reduced. Therefore, azimuth angle $\alpha$ should desirably be as small as possible.

Figure 14:
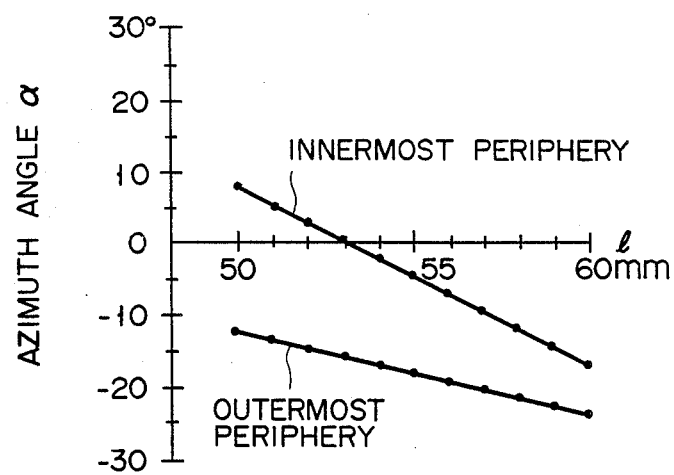
FIG. 14 is a diagram showing changes in the azimuth angle when the distance between the center of the gap and the rotational center of the head arm is changed in the conventional carriage mechanism of FIG. 9.

In the conventional carriage mechanism shown in FIG. 9, if the distance l is varied in the range of 50 mm to 60 mm, the azimuth angle at the innermost peripheral position B and the outermost peripheral position C of the disc changes as is shown in FIG. 14. It is understood that there is no area where the azimuth angle $\alpha$ approaches zero at both positions B and C.

Figure 16:
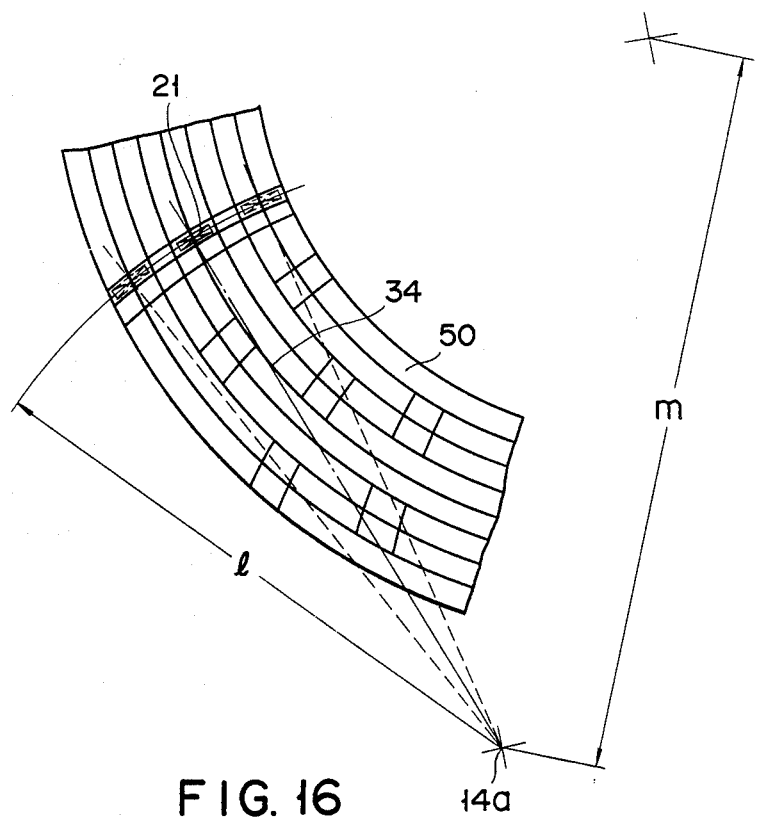
Figure 17:
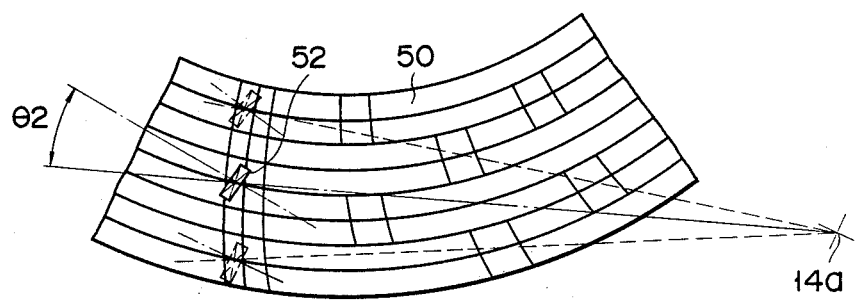

In the carriage mechanism of a servo surface servo type magnetic disc apparatus, if the slider is arranged to be inclined at angle $\theta_1$, it is likely that the accuracy of the servo action, that is, the positioning deteriorates. To be more specific, a plurality of servo patterns 50 are recorded on the servo surface, namely, the surface of disc 15 as is shown in FIG. 16. In order for gap 21 of the magnetic head to be positioned at a specified position with respect to servo patterns 50, it is necessary for the extension of principal line 34 of gap 21 to pass through rotational center 14a of the head arm. If the slider is mounted tilted by angle $\theta_1$ so as to reduce yaw angle $\theta_2$ of the slider as is described earlier, azimuth angle $\theta_2$ occurs at gap 21 as is shown in FIG. 17. This angle $\theta_2$ is almost identical with the angle $\theta_1$ but varies with the physical position of the magnetic gap o the slider that differs along different types of magnetic head.

To solve the above problem, according to the second embodiment of this invention, gap 21 is arranged so that principal axis 34 of gap 21 forms angle $\theta_2$ with principal axis 30 of slider 20 and passes through rotational center 14a of head arm 11. Since the mounting angle of gap 21 is tilted by angle $\theta_2$ in design, azimuth $\theta_2$ is prevented from occurring. Therefore, when the magnetic head is used for servo surface servo, it is possible to prevent the readout accuracy of servo data from deteriorating due to the azimuth, thereby performing an accurate readout motion.

Figure 15:
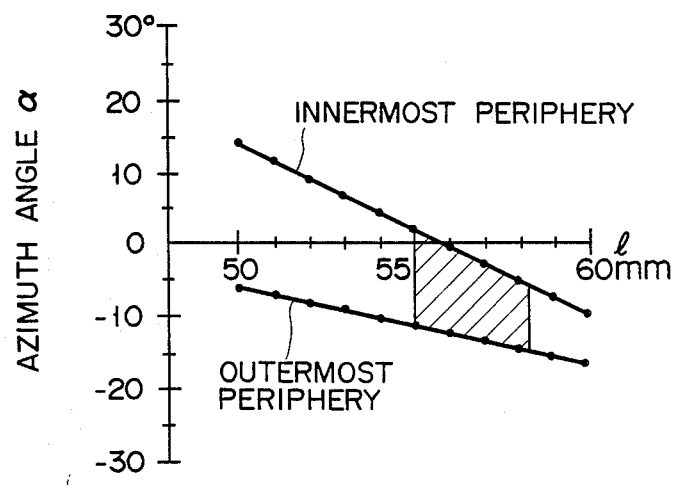
FIG. 15 is a diagram showing changes in the azimuth angle when the distance between the center of the gap and the rotational center of the head arm is changed in the carriage mechanism of FIG. 3, and FIGS. 16 and 17 are views showing the positional relations between the gap and the servo data when there is the azimuth angle and when there is not.

FIG. 15 shows the changes in azimuth angle $\alpha$ at the innermost peripheral position B and the outermost peripheral position C of disc 15 when the distance l from the center of gap 21 to rotational center 14a of arm 11 is varied in the carriage mechanism according to the second embodiment. As can be seen from FIG. 15, when the distance l is about 56 mm, azimuth angle $\alpha$ is zero near the innermost peripheral position of disc 15. The innermost peripheral position and its vicinity of the disc are the area where the peripheral speed of the disc is fastest and the electromagnetic conversion characteristics of the magnetic head lower. According to this embodiment, azimuth angle $\alpha$ in the innermost peripheral area can be reduced to almost zero, thus ensuring excellent electromagnetic conversion characteristics to the magnetic head.

As described above in detail, according to the second embodiment, the yaw angle and the azimuth angle can be set in the permissible ranges, so that the floating property and the electromagnetic conversion characteristics of the magnetic head can be stabilized. Consequently, the whole carriage mechanism can be reduced in size and weight, and the magnetic head can be securely prevented from being damaged by a head crush or the like. The permissible range of positioning the magnetic head for read/write actions increases and readout of serve data from the servo surface can be effected securely, above all else. Therefore, it is possible to provide magnetic disc apparatuses in smaller size and with higher performance.

What is claimed is:

1. A magnetic head carriage mechanism for a magnetic disk, comprising:
    a head arm rotatable around a vertical axis;
    a spring member fixed to the head arm;
    a generally rectangular slider supported by the spring member, having a first longitudinal central axis perpendicular to the vertical axis of the head arm, said slider, spring member, and head arm being arranged in a generally straight line along the first longitudinal axis;
    a generally rectangular magnetic head fixed to the slider offset a predetermined distance from the first longitudinal axis, said magnetic head including a magnetic gap having a width extending in a direction perpendicular to the first longitudinal axis, said magnetic head having a second longitudinal central axis extending through the center of and perpendicular to the width of the magnetic gap, said magnetic head being arranged such that an extension of the second longitudinal axis passes through the vertical axis of the head arm and is parallel to the first longitudinal axis; and means for rotating the head arm.

2. A magnetic head carriage mechanism for a magnetic disc, comprising:

a head arm rotatable around a vertical axis;

a spring member fixed to the head arm;

a generally rectangular slider supported by the spring member and arranged along with the head arm and spring member in a generally straight line, said slider having a first longitudinal central axis perpendicular to the vertical axis of the head arm forming a first angle with a straight line passing through the vertical axis of the head arm and a geometric center of the slider, so as to reduce a yaw angle of the slider;

a magnetic head including a magnetic gap having a width, said magnetic head fixed to the slider; and means for rotating the head arm.

3. A magnetic head carriage mechanism according to claim 2, wherein said magnetic gap has a second longitudinal central axis extending in a direction perpendicular to the width of the magnetic gap, said magnetic gap being arranged such that an extension of the second longitudinal axis passes through the vertical axis of the head arm and forms a second angle with the first longitudinal axis, so as to reduce an azimuth angle of the magnetic gap.

4. A magnetic head carriage mechanism according to claim 3, wherein said magnetic gap is arranged such that the second longitudinal axis is spaced a specified distance from the first longitudinal axis, in a direction perpendicular to the first longitudinal axis.

5. A magnetic head carriage mechanism according to claim 3, wherein said first and second angles are in range of greater than 0° and equal to or less than 20°, respectively.

6. A magnetic head carriage mechanism according to claim 2, wherein said magnetic gap includes a geometric center, and said first longitudinal axis passes through the geometric center of the magnetic gap.

* * * * *

UNITED STATES PATENT AND TRADEMARK OFFICE
CERTIFICATE OF CORRECTION

PATENT NO. : 4,926,275
DATED : May 15, 1990
INVENTOR(S) : Hiroyuki Kuno et al.

It is certified that error appears in the above-identified patent and that said Letters Patent is hereby corrected as shown below:

On the title page under Assignee, add --Toshiba Computer Engineering Corporation, Tokyo, Japan--.

Signed and Sealed this

Twenty-seventh Day of October, 1992

*Attest:*

DOUGLAS B. COMER

*Attesting Officer*   Acting Commissioner of Patents and Trademarks